(Model.)
J. M. BEACH.
CORSET FASTENING.
No. 244,171.  Patented July 12, 1881.
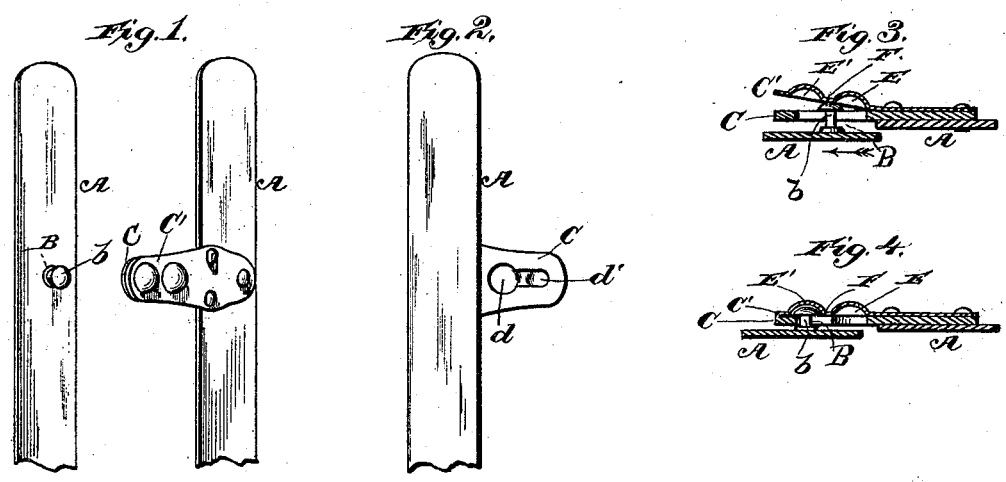
Witnesses
Robt Everett
J. A. Rutherford
Inventor:
Joseph M. Beach,
By James L. Norris.
Atty.

United States Patent Office.

JOSEPH M. BEACH, OF HUNTINGTON, ASSIGNOR TO THE OSBORNE & CHEESMAN COMPANY, OF ANSONIA, CONNECTICUT.

CORSET-FASTENING.

SPECIFICATION forming part of Letters Patent No. 244,171, dated July 12, 1881.

Application filed May 20, 1881. (Model.)

*To all whom it may concern:*

Be it known that I, JOSEPH M. BEACH, a citizen of the United States, residing at Huntington, in the county of Fairfield and State of Connecticut, have invented a new and useful Improvement in Corset-Clasps, of which the following is a specification.

The object of this invention is to provide a strong, cheap, and durable spring-fastening for holding the stays at the meeting edges of a corset together. To such end I provide one of the stays at one side of the corset with a stud formed with a head, and secure to the stay at the opposite side or edge of the corset a pair of plates, the inner one of which plates is provided with an enlarged opening extended into a contracted slot, and the remaining plate being a spring-plate, and provided with two concavities, the walls of which are closed, and each capable of receiving the head of the stud, said closed concavities being separated by an intervening depending partition between the two concavities, whereby the head of the stud can be engaged in and covered and concealed by the concavity at the outer end of the plate by being forced beneath the said depending shoulder or partition, as hereinafter more fully described.

In the drawings, Figure 1 illustrates portions of two stays, with my improved fastening device applied thereto. Fig. 2 is a view of the opposite side of the spring locking-plate. Fig. 3 is a transverse section through the fastening device, the stud pressing against the partition between the two concavities of the spring-plate. Fig. 4 is a like view with the stud interlocked by the spring-plate.

A A indicate portions of two corset-stays, to one of which is secured a stud, B, formed with a head, *b*. To the other stay I rivet or otherwise secure the two plates C C′, the outer plate, C′, being a spring-plate, so that it can be sprung at its end away from the plate C, upon which it normally rests. The plate C is provided with an enlarged opening, *d*, which is extended into a contracted slot, *d′*, of less width than the diameter of the head of the stud. The plate C′ is provided with two concaved depressions or cavities, E E′, the walls of which are closed, forming covered chambers to receive the head of the stud. The spring-plate is struck up or otherwise formed with these concavities or depressions, which are separated from each other by an intervening depending partition, F, constituting a shoulder or transverse ledge, against which the head of the stud is locked when the parts are connected, as shown in Fig. 4.

In using the device the head of the stud is passed through the enlarged opening *d*, where it is properly and accurately centered, by the inner concaved depression, E, in line with the contracted slot *d′*, and the edges of the corset are then allowed to spring apart, so as to force the stud into the contracted slot *d′* and carry its head under and past the partition between the two concavities into the second or outer concavity, E′, the closed top wall of which serves also to cover and conceal the head of the stud. As the head of the stud passes under this depending dividing-partition F the free end of the spring-plate will be pushed away from the other plate, as shown in Fig. 3; but as soon as the head of the stud has entered the second or outer concavity, E′, the spring-plate will spring back upon the slotted plate, as shown in Fig. 4, thereby preventing the head of the stud from being accidentally drawn under the dividing-partition between the two concavities.

By this construction it will be seen that the stud cannot be withdrawn from the inner concavity or seat, E′, through the narrow portion of the slot, but that it must be brought into the seat or concavity E at the inner end of the spring-plate; and it will also be seen that the top walls of the two concave depressions serve to cover and conceal the head of the stud, so that the clothing cannot catch on the said head of the stud, while they also retain the headed stud securely against the inner plate.

In order to release the stud from the spring-plate, the stays at the meeting-edges of the corset must be brought together so as to cause the stud to push the spring-plate away from the plate C, and thereby bring the stud to the enlarged portion *d* of the opening in said plate, whereby the stud can be readily drawn through said part of the slot.

Heretofore a corset-clasp has been composed of an inner slotted plate and an outer spring-plate having at or near its free end a single concavity for receiving and covering the head of the stud on the adjacent corset-stay, when said head is inserted through the slotted inner plate and pushed toward the free end of the spring-plate. Such structure, however, is not my invention, and is not broadly claimed.

Having thus described my invention, what I claim, and desire to secure by Letters Patent, is—

A corset-clasp in which are combined a headed stud attached to one stay and two plates secured to the other stay, the inner plates having an enlarged opening extended into a contracted slot and the outer plate having two concave depressions or cavities with closed top walls, and separated from each other by a depending dividing-partition forming a shoulder or ledge between the two concavities, said headed stud being adapted to pass through the enlarged opening in the inner plate into the inner concavity, by which it is properly centered, and then pushed under the dividing-partition into the outer concavity, and interlock against the said partition, substantially as described.

In testimony whereof I have hereunto set my hand in the presence of two subscribing witnesses.

JOSEPH M. BEACH.

Witnesses:
ADOLPH W. KING,
WILLIAM HALSE.